United States Patent
Diethorn et al.

(10) Patent No.: US 8,184,790 B2
(45) Date of Patent: May 22, 2012

(54) NOTIFICATION OF DROPPED AUDIO IN A TELECONFERENCE CALL

(75) Inventors: Eric John Diethorn, Long Valley, NJ (US); Jean Meloche, Madison, NJ (US); Jay M. Stiles, Watchung, NJ (US)

(73) Assignee: Avaya Inc., Basking Ridge, NJ (US)

( * ) Notice: Subject to any disclaimer, the term of this patent is extended or adjusted under 35 U.S.C. 154(b) by 915 days.

(21) Appl. No.: 12/207,200

(22) Filed: Sep. 9, 2008

(65) Prior Publication Data
US 2010/0061535 A1  Mar. 11, 2010

(51) Int. Cl.
*H04M 3/42* (2006.01)
*H04M 9/08* (2006.01)
*H04M 1/00* (2006.01)
*H04M 9/00* (2006.01)

(52) U.S. Cl. ......... 379/202.01; 379/388.07; 379/406.01; 379/406.03

(58) Field of Classification Search ............. 379/202.01, 379/406.01, 406.03, 388.07, 396; 455/416, 455/570
See application file for complete search history.

(56) References Cited

U.S. PATENT DOCUMENTS

| 6,556,670 | B1 * | 4/2003 | Horn ........................ 379/202.01 |
| 7,003,286 | B2 * | 2/2006 | Brown et al. ................. 455/416 |
| 2003/0185371 | A1 | 10/2003 | Dobler |
| 2004/0218553 | A1 | 11/2004 | Friedrich et al. |
| 2007/0286347 | A1 | 12/2007 | Moore |

FOREIGN PATENT DOCUMENTS
EP  1505815 A1  2/2005

OTHER PUBLICATIONS

Stokes, Jared, "GB Application No. GB0915373.5 Search Report Nov. 27, 2009"Publisher: UK IPO, Published in: GB.

* cited by examiner

*Primary Examiner* — Thjuan K Addy

(57) ABSTRACT

A method enables a participant in a conference call to monitor, as he is speaking, whether his speech is getting through to the other participants. A teleconference bridge receives audio signals from a group of telecommunications endpoints that are involved in a conference call. The bridge generates audio signals to be transmitted, which are based on one or more of the received audio signals. During the ongoing process of minimizing the presence of acoustic echo, the bridge might exclude one or more of the received audio signals from the transmitted audio signals. When this occurs, particularly when an active talker is being excluded, the bridge transmits an indication to one or more of the endpoints as part of one of the transmitted audio signals. The indication can be audible such as a tone or a voice, visual such as a flashing light, or tactile such as vibration.

19 Claims, 2 Drawing Sheets

NOTIFICATION OF DROPPED AUDIO IN A TELECONFERENCE CALL

FIELD OF THE INVENTION

The present invention relates to telecommunications in general, and, more particularly, to notifying one or more users of telecommunications endpoints that their audio signals are being dropped during a conference call.

A teleconferencing system enables concurrent communication among three or more participants. Typically, such a system comprises a teleconference bridge, which mixes the audio signals arriving from the telecommunications endpoints of the participants and transmits an appropriately-mixed signal back to each of the endpoints. The endpoints themselves might be handset-equipped telephones or they might be speakerphone-equipped telephones, or a combination of the two.

The telecommunications equipment that enable conference calls often do so in an imperfect manner. Part of the problem is that a teleconferencing system, with its teleconference bridge and speakerphones, if present, has to deal with the presence of acoustic echo. Acoustic echo can be introduced at each conference call location when the local endpoint's microphone picks up the acoustic signals that are emitted by the endpoint's loudspeaker and re-introduces delayed versions of audio signals already processed by the bridge.

Different techniques are used to deal with the presence of acoustic echo. One such technique is automatic microphone mixing. This is used at the teleconference bridge during the mixing process referred to earlier, in that the mixer receives signals from the endpoints involved in a conference call and determines which signals are to be passed along to the various endpoints and which ones are to be excluded, at any given moment. As a result, loudspeaker-to-microphone coupling is reduced by the amount that the automatic mixer excludes the so-called off-channels.

Another technique for dealing with the presence of echo is acoustic echo suppression, which is performed at a speakerphone. Here, the speakerphone detects if there is sufficient enough energy in the audio signal that arrives from a far-end participant. If there is sufficient energy, the speakerphone essentially mutes its microphone, thereby excluding at least a portion of any audio signals that would otherwise be picked up by the microphone and introduced into the conference call.

A problem with these techniques is that each participant on the conference call experiences a "half-duplex" effect, in which a participant who is talking might think that her voice is getting through to the rest of the participants but, in reality, is not. This often causes frustration on the part of the talking participant whose speech is being excluded by someone else who is also talking, particularly when the participant who is being excluded talks for several seconds, only then to find out that no one else had heard her. Additionally, depending on each participant's acoustic environment, the type of endpoint being used, and the manner in which the endpoint is being used, the exclusionary effect on the audio signals might occur more often for some participants than for others. This lopsided treatment can cause frustration for some participants even more than others on a call.

SUMMARY OF THE INVENTION

The present invention enables a participant in a conference call to monitor, as he is speaking, whether his speech is getting through to the other participants. In accordance with the illustrative embodiment of the present invention, a teleconference bridge receives audio signals from a group of telecommunications endpoints that are involved in a conference call. The teleconference bridge generates transmit audio signals that are based on one or more of the received audio signals. During the ongoing process of minimizing the presence of acoustic echo, the bridge might exclude one or more of the received audio signals from the transmitted audio signals. When this occurs, particularly when an active talker is being excluded, the teleconference bridge transmits an indication to one or more of the endpoints as part of one of the transmitted audio signals. The indication can be audible such as a tone or a voice, visual such as a flashing light or displayed text, or tactile such as vibration.

In accordance with the illustrative embodiment, the bridge transmits the indication to the endpoint of the excluded active talker. In some alternative embodiments, however, the bridge can transmit the indication to the other endpoints as well, in order to warn one or more other participants that an active talker is being excluded. For example, the bridge might send the indication to an active talker whose signal is not being excluded, to participants who are merely listening and not talking at that particular moment, and so forth.

By notifying the talking participant that his voice is not getting through the teleconferencing equipment to the other participants, the technique of the illustrative embodiment is aimed at reducing frustration on the part of the talking participant. Moreover, the illustrative embodiment empowers the excluded talking participant to quickly preempt, if necessary, another participant who is talking—for example, by pressing a keypad key, in order to transmit a dual-tone multi-frequency (DTMF) tone that is audible to the other participant. Alternatively, embodiments of the present invention also enable a talking participant to know when another participant is being excluded and to adjust his speaking patterns accordingly to offer the other participant more chances to speak and be heard.

The illustrative embodiment of the present invention comprises: receiving, at a teleconference bridge, a plurality of receive audio signals from a group of telecommunications endpoints that are involved in a conference call; generating at the teleconference bridge, for the group of telecommunications endpoints, a plurality of transmit audio signals that are based on at least one of the receive audio signals, in which one or more of the receive audio signals are excluded from at least one of the transmit audio signals when a signal level criterion is met; and when the one or more of the receive audio signals are excluded, transmitting to at least one of the endpoints a first audible indication as part of one or more of the transmit audio signals.

DETAILED DESCRIPTION

Figure 1:
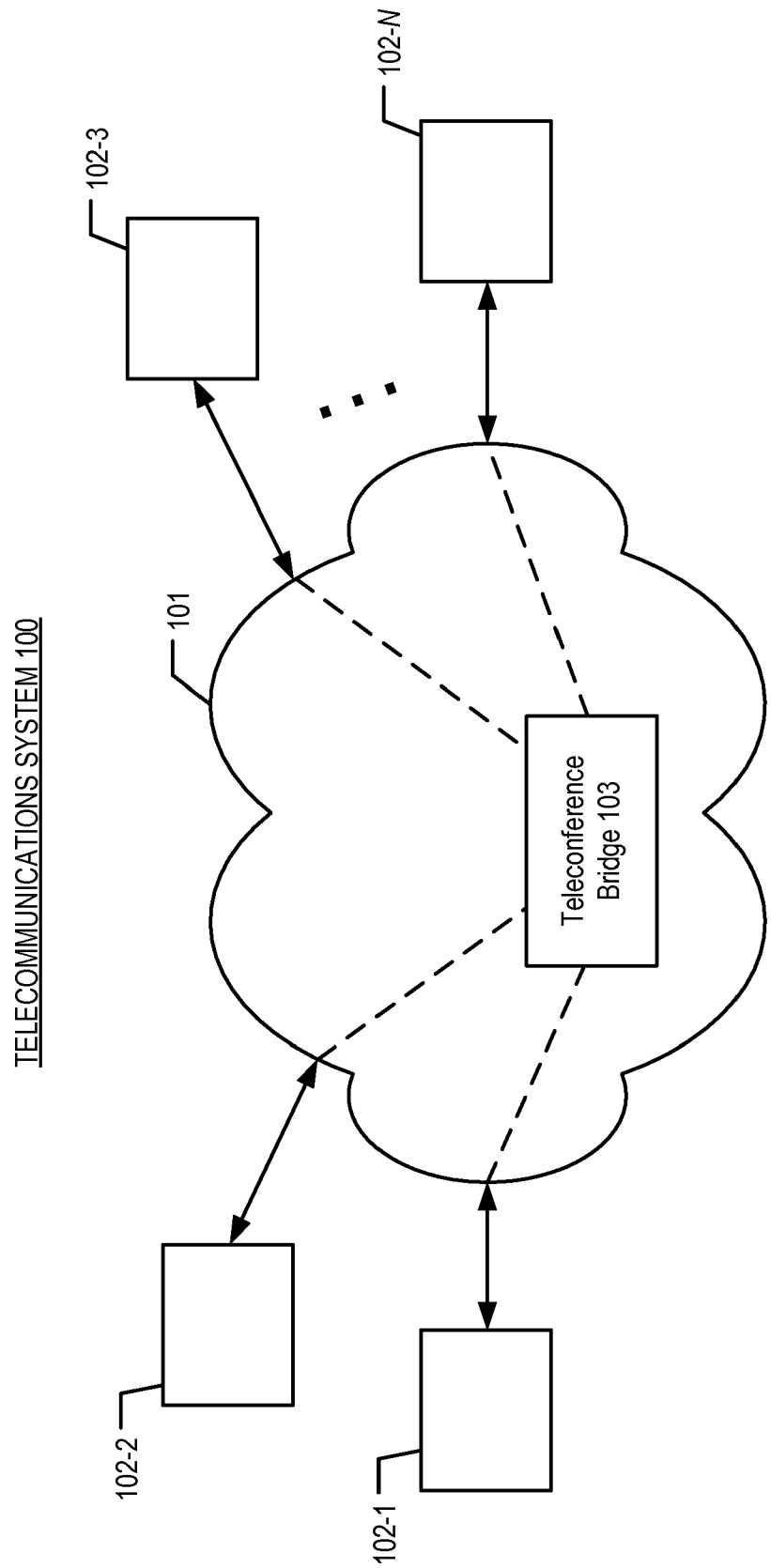
FIG. 1 depicts a schematic diagram of telecommunications system 100 in accordance with the illustrative embodiment of the present invention.

FIG. 1 depicts a schematic diagram of telecommunications system 100 in accordance with the illustrative embodiment of the present invention. System 100 comprises telecommunications network 101; telecommunications endpoints 102-1 through 102-N, wherein N is a positive integer greater than one; and teleconference bridge 103. The elements in system 100 are interconnected as shown.

Telecommunications network 101 enables the transport and control of communications signals among endpoints such as endpoints 102-1 through 102-N. The communications signals convey media signals, such as audio, video, and so forth. To this end, network 101 comprises one or more interconnected data-processing systems such as switches, servers, routers, gateways, and teleconference bridges, as are well-known in the art. For example, network 101 comprises teleconference bridge 103.

In accordance with the illustrative embodiment, network 101 comprises an Internet Protocol-based (IP-based) network, as is known in art, for the purpose of transmitting bitstreams of encoded voice signals. Although network 101 in the illustrative embodiment comprises a Voice-over-IP (VoIP) service provider's network, network 101 could alternatively or additionally comprise another type of network such as the Internet, some other type of IP-based network, or some other type of packet-based network, as those who are skilled in the art will appreciate.

Telecommunications endpoints 102-1 through 102-N are telephony devices, such as speakerphones, desksets, cellular phones, soft phones resident in computers, personal digital assistants, and so forth. Each of endpoints 102-1 through 102-N enables their users to communicate at least audibly with one other, or with users of other endpoints supported by network 101 that are not depicted. Accordingly, endpoints 102-1 through 102-N interoperate with network 101 and with one other in well-known fashion.

In accordance with the illustrative embodiment, endpoint 102-n, wherein n has a value of 1 through N, is a Voice over Internet Protocol (VoIP) phone. However, it will be clear to those skilled in the art, after reading this specification, how to make and use alternative embodiments, in which endpoint 102-n is a type of endpoint other than a VoIP phone. And as those who are skilled in the art will also appreciate, embodiments of the present invention can be made and used in which endpoint 102-n operates in various types of networks such as public networks, private networks, and so forth.

Teleconference bridge 103 is a server or switch that enables the users of multiple endpoints to communicate with one other during a conference call. Bridge 103 receives audio signals from endpoints that are participating on a conference call, mixes those signals together based on the transfer function associated with each output channel, and transmits the mixed signals back to the endpoints, in accordance with the illustrative embodiment of the present invention. Bridge 103 performs the tasks of the illustrative embodiment that are described below and with respect to FIG. 2.

As those who are skilled in the art will appreciate, the techniques of the illustrative embodiment can be implemented at a device other than a teleconference bridge or at a teleconference bridge that is other than a server or switch.

Figure 2:
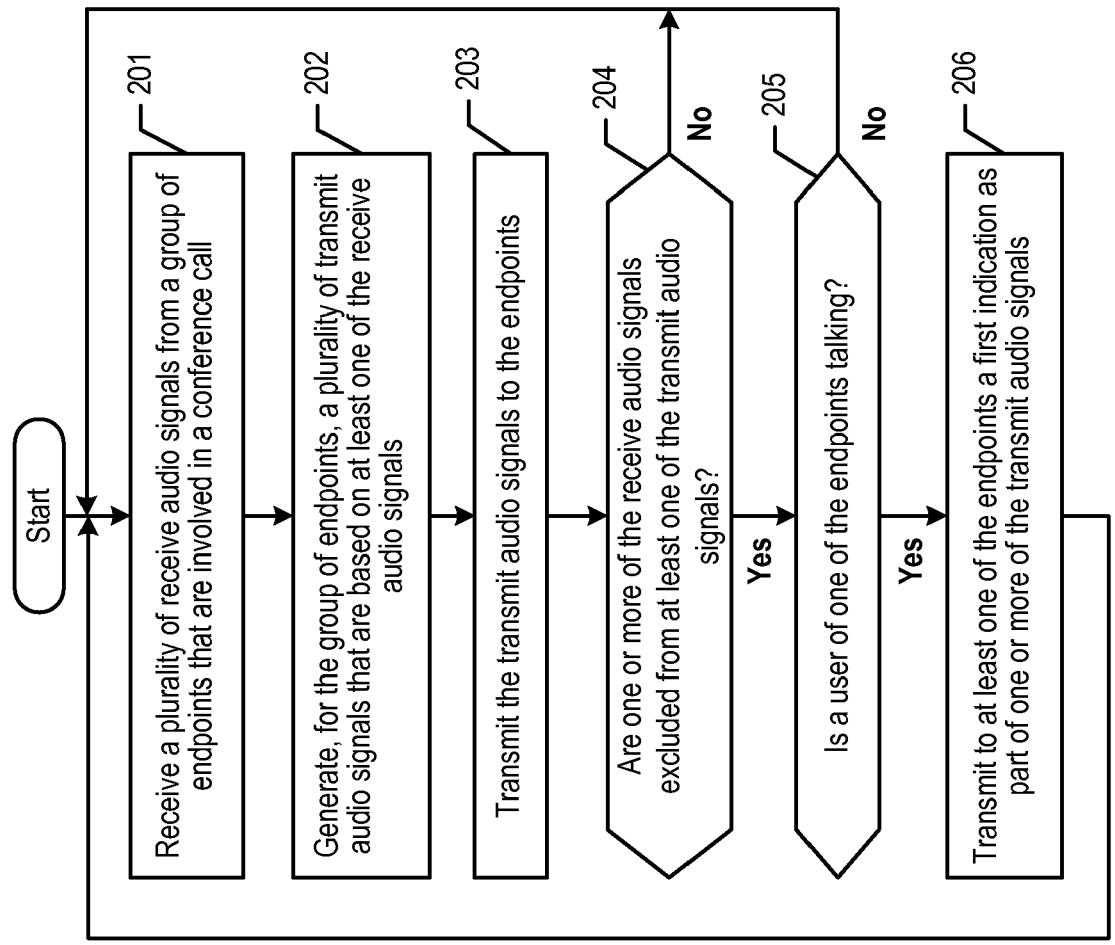
FIG. 2 depicts a flowchart of the salient tasks performed by teleconference bridge 103, in accordance with the illustrative embodiment of the present invention.

FIG. 2 depicts a flowchart of the salient tasks performed by teleconference bridge 103, in accordance with the illustrative embodiment of the present invention. As those who are skilled in the art will appreciate, some or all of the individual tasks depicted in FIG. 2 can be performed simultaneously or performed in a different order from that depicted.

For pedagogical purposes, all of telecommunications endpoints 102-1 through 102-N are involved in the same conference call, where N is equal to three. It will be clear, however, to those who are skilled in the art how to make and use embodiments of the present invention in which there is a different number of endpoints involved in the conference call (i.e., N is equal to a number other than three).

At task 201, bridge 103 receives a plurality of receive audio signals, $s_1$ through $s_N$, from telecommunications endpoints 102-1 through 102-N, respectively, for a given conference call.

At task 202, bridge 103 generates, for the given conference call, a plurality of transmit audio signals, $x_1$ through $x_N$ that are intended for endpoints 102-1 through 102-N, respectively. Each of the generated transmit audio signals is based on at least one of the receive audio signals. During the course of the conference call, bridge 103 excludes, in well-known fashion, one or more of the receive audio signals from at least one of the transmit audio signals whenever a predetermined signal level criterion is met. In some embodiments, bridge 103 sums up, at any particular time, only the receive audio signals that correspond to the M loudest talkers (e.g., M equals three, etc.) and passes that sum to listening participants as part of the one or more transmit audio signals generated.

As those who are skilled in the art will appreciate, in "excluding" a particular receive audio signal, bridge 103 might exclude only some of the energy of the signal—that is, it might attenuate and/or filter the signal rather than exclude the signal entirely. For example, in some alternative embodiments, bridge 103 performs a summation that comprises the receive audio signals from most or all participants, in which the sum is weighted with louder talkers being weighted more heavily than weaker talkers.

At task 203, bridge 103 transmits, in well-known fashion, the transmit audio signals $x_1$ through $x_N$ to endpoints 102-1 through 102-N, respectively.

At task 204, bridge 103 determines whether one or more of the receive audio signals are being excluded from at least one of the transmit audio signals. If so, task execution proceeds to task 205. Otherwise, task execution proceeds back to task 201.

At task 205, bridge 103 detects, in well-known fashion, whether a user of one of endpoints 102-1 through 102-N is talking. For example, bridge 103 can monitor the signal energy contained in the receive audio signals in order to determine that a user is talking. If a user is detected as talking, task execution proceeds to task 206. Otherwise, task execution proceeds to task 201.

At task 206, bridge 103 transmits to at least one of endpoints 102-1 through 102-N a first indication as part of one or more of the transmit audio signals. In accordance with the illustrative embodiment, the first indication is an audible indication such as a tone or speech, which is transmitted only to the endpoint whose user is detected as talking. For example, bridge 103 transmits the first indication to endpoint 102-1 when the bridge i) excludes the receive audio signal $s_1$ from the transmit audio signal $x_2$ and ii) detects the user of endpoint 102-1 as talking. In some alternative embodiments, bridge 103 transmits an indication when it excludes the receive audio signal $s_1$ from the transmit audio signal $x_2$, but independently of detecting the user of endpoint 102-1 as talking.

In some other alternative embodiments, bridge 103 transmits the indication to one or more endpoints in addition to, or instead of, the endpoint whose user is detected as talking. For example, bridge 103 can transmit a second indication to endpoint 102-1—that is, the same endpoint as in the example in the previous paragraph—when the bridge i) excludes the receive audio signal $s_2$ from the transmit audio signal $x_1$ and ii) detects the user of endpoint 102-2 as talking. And from endpoint 102-2's perspective, bridge 103 can transmit another indication to endpoint 102-2 when the bridge i) excludes the receive audio signal $s_2$ (received from endpoint 102-2) from the transmit audio signal $x_1$ (being transmitted to endpoint 102-1) and ii) detects the user of endpoint 102-2 as talking.

As those who are skilled in the art will appreciate, a transmitted indication can be in the form of something other than an audible signal. For example, the transmitted indication can be in the form of a control signal which, for example, commands the endpoint that is receiving it to produce a visible indication for its user.

In some embodiments, the indication (audible, visible, or otherwise) can provide an indicium that corresponds to an endpoint whose signal is being excluded, an indicium such as the endpoint's telephone number, the name of the endpoint's user, and so forth. If the indication is, in fact, in the form of speech, the indication can identify (i.e., "speak") the particular user or endpoint whose audio signal is being excluded and/or ii) identify the users or endpoints that are not receiving the excluded signal, assuming that some endpoints are receiving the signal and some are not. As those who are skilled in the art will appreciate, the particular indicium used can be derived from database information maintained by bridge 103 or a related node. In turn, the database information could have been obtained from the caller identification received when each participant dialed into the bridge, obtained from each participant having spoken his or her name at the beginning of the conference call, and so forth.

After task 206, task execution proceeds back to task 201, in order to continue processing the conference call until the conference call is ended.

It is to be understood that the disclosure teaches just one example of the illustrative embodiment and that many variations of the invention can easily be devised by those skilled in the art after reading this disclosure and that the scope of the present invention is to be determined by the following claims.

What is claimed is:

1. A method comprising:
receiving, at a teleconference bridge, a plurality of receive audio signals from a group of telecommunications endpoints that are involved in a conference call;
generating at the teleconference bridge, for the group of telecommunications endpoints, a plurality of transmit audio signals that are based on at least one of the receive audio signals, in which a receive audio signal is excluded from at least one of the transmit audio signals associated with the receive audio signal indicates that a user is talking at an endpoint associated with the receive audio signal;
detecting, in the receive audio signal, whether a user at the associated endpoint is talking
when the receive audio signal is excluded, transmitting to at least one of the endpoints a first audible indication as part of one or more of the transmit audio signals only when the user is detected as talking.

2. The method of claim 1, wherein the transmitting of the first audible indication is to an endpoint whose user is detected as talking and whose receive audio signal is being excluded.

3. The method of claim 2, wherein the first audible indication is in the form of a tone.

4. The method of claim 1, wherein the transmitting of the first audible indication is to an endpoint whose receive audio signal is not being excluded.

5. The method of claim 1, wherein the first audible indication provides an indicium that corresponds to an endpoint whose audio signal is being excluded.

6. The method of claim 5, wherein the first audible indication is in the form of speech.

7. The method of claim 1, further comprising transmitting, to at least one endpoint in the group, a second indication in the form of a control signal, wherein the control signal commands the at least one endpoint to produce a visible indication.

8. A method comprising:
receiving, at a teleconference bridge, a plurality of receive audio signals from a group of telecommunications endpoints that are involved in a conference call, the plurality comprising a receive audio signal $s_1$ from a first endpoint and a receive audio signal $s_2$ from a second endpoint in the group;
detecting in the receive audio signal $s_1$ whether the user of the first endpoint is talking;
generating at the teleconference bridge, for the second endpoint, a transmit audio signal $x_2$ that is based on at least one of the receive audio signals, in which one or more of the receive audio signals are excluded from the transmit audio signal $x_2$ when a signal level criterion is met; and
transmitting a first indication to the first endpoint when i) the receive audio signal $s_1$ is excluded from the transmit audio signal $x_2$ and ii) the user of the first endpoint is detected as talking.

9. The method of claim 8 wherein the first indication is in audible form.

10. The method of claim 9 wherein the first indication is in the form of a tone.

11. The method of claim 9 wherein the first indication is in the form of speech.

12. The method of claim 8 wherein the first indication is in the form of a control signal.

13. The method of claim 12 wherein the control signal commands the second endpoint to produce a visible indication.

14. The method of claim 8 further comprising:
detecting in the receive audio signal $s_2$ whether the user of the second endpoint is talking; and
transmitting a second indication to the second endpoint when i) the receive audio signal $s_1$ is excluded from the transmit audio signal $x_2$ and ii) the user of the second endpoint is detected as talking.

15. The method of claim 14 wherein the second indication provides an indicium that corresponds to an endpoint whose signal is being excluded.

16. A method comprising:
receiving, at a teleconference bridge, a plurality of receive audio signals from a group of telecommunications endpoints that are involved in a conference call, the plurality comprising a receive audio signal $s_1$ from a first endpoint and a receive audio signal $s_2$ from a second endpoint in the group;
detecting i) in the receive audio signal $s_1$ whether the user of the first endpoint is talking, and ii) in the receive audio signal $s_2$ whether the user of the second endpoint is talking;
generating at the teleconference bridge, for the second endpoint, a transmit audio signal $x_2$ that is based on at least one of the receive audio signals, in which one or more of the receive audio signals are excluded from the transmit audio signal $x_2$ when a signal level criterion is met; and when the receive audio signal $s_1$ is excluded from the transmit audio signal $x_2$, transmitting i) a first indication to the first endpoint when the user of the first endpoint is detected as talking and ii) a second indication to the second endpoint when the user of the second endpoint is detected as talking.

17. The method of claim 16 wherein the first indication is in audible form.

18. The method of claim 17 wherein the first indication is in the form of a tone.

19. The method of claim 17 wherein the first indication is in the form of speech.

* * * * *

UNITED STATES PATENT AND TRADEMARK OFFICE
CERTIFICATE OF CORRECTION

PATENT NO. : 8,184,790 B2  
APPLICATION NO. : 12/207200  
DATED : May 22, 2012  
INVENTOR(S) : Diethorn et al.

It is certified that error appears in the above-identified patent and that said Letters Patent is hereby corrected as shown below:

In the Claims

Column 5, Claim 1, line 37, change "plurality of receive signals" to --receive audio signal--.

Column 5, Claim 1, line 42, change "at least one of the receive audio signals" to --the receive audio signal--.

Column 5, Claim 1, line 43, change "signal is excluded" to --signal, excluded--.

Column 5, Claim 1, line 45, change "signal indicates" to --signal, indicates--.

Column 5, Claim 3, line 59, change "the form" to --a form--.

Column 6, Claim 8, line 14, change "the user" to --a user--.

Column 6, Claim 8, line 18, change "one or more receive audio signals are" to --at least one of the receive audio signals is--.

Column 6, Claim 10, line 30, change "the form" to --a form--.

Column 6, Claim 11, line 32, change "the form" to --a form--.

Column 6, Claim 12, line 34, change "the form" to --a form--.

Column 6, Claim 14, line 40, change "the user" to --a user--.

Column 6, Claim 16, line 58, change "the user" to --a user--.

Column 6, Claim 16, line 60, change "the user" to --a user--.

Signed and Sealed this  
Eleventh Day of February, 2014

Michelle K. Lee  
*Deputy Director of the United States Patent and Trademark Office*

CERTIFICATE OF CORRECTION (continued)
U.S. Pat. No. 8,184,790 B2

Column 6, Claim 16, line 64, change "one or more receive audio signals are" to --at least one of the receive audio signals is--.

Column 8, Claim 18, line 2, change "the form" to --a form--.

Column 8, Claim 19, line 4, change "the form" to --a form--.